United States Patent [19]

Marosan

[11] 4,126,506

[45] Nov. 21, 1978

[54] MATERIAL-HANDLING APPARATUS

[75] Inventor: Josef Marosan, Jonkoping, Sweden

[73] Assignee: Smalands Industrirationalisering AB, Huskvarna, Sweden

[21] Appl. No.: 802,665

[22] Filed: Jun. 2, 1977

[30] Foreign Application Priority Data

Jun. 8, 1976 [SE] Sweden .............................. 7606397

[51] Int. Cl.$^2$ ............................................ B29H 17/00
[52] U.S. Cl. ................................. 156/396; 214/11 R; 214/16 B; 425/18
[58] Field of Search .................................... 425/17–19; 214/16 B, 16.4 R, 16.4 A, 1 BC, 1 BB; 104/252, 253; 198/473; 156/396

[56] References Cited

U.S. PATENT DOCUMENTS

| | | | |
|---|---|---|---|
| 3,043,447 | 7/1962 | Lauck et al. | 214/1 BC |
| 3,051,328 | 8/1962 | Brown et al. | 214/1 BC |
| 3,067,457 | 12/1962 | Dennis et al. | 214/16.4 R |
| 3,080,840 | 3/1963 | DeMan | 214/141 |
| 3,398,842 | 8/1968 | Schickle | 214/16 B |
| 3,557,973 | 1/1971 | Louviers | 214/16 B |
| 3,576,540 | 4/1971 | Fair et al. | 214/16 B |
| 3,753,507 | 8/1973 | James et al. | 214/16.4 R |

*Primary Examiner*—Lawrence J. Oresky
*Attorney, Agent, or Firm*—Dorfman, Herrell and Skillman

[57] ABSTRACT

Material-handling apparatus is illustrated in a tire-recapping plant where tires of various sizes are automatically fed to a cluster of recapping machines by a feed conveyor in proper sequence for loading each machine with a tire of the proper type and size. The tire is automatically centered for engagement by the gripping arms of a transfer apparatus which transfers the tire from the feed conveyor to the proper recapping machine. At the completion of the recapping operation in each machine, the recapped tire is picked up by the transfer mechanism and is deposited on the dicharge conveyor, and the transfer mechanism then automatically reloads the machine with a tire of the proper size and type which is centered on the feed conveyor. The machine is controlled automatically to eliminate manual handling of the tires in the immediate vicinity of the recapping machine.

24 Claims, 23 Drawing Figures

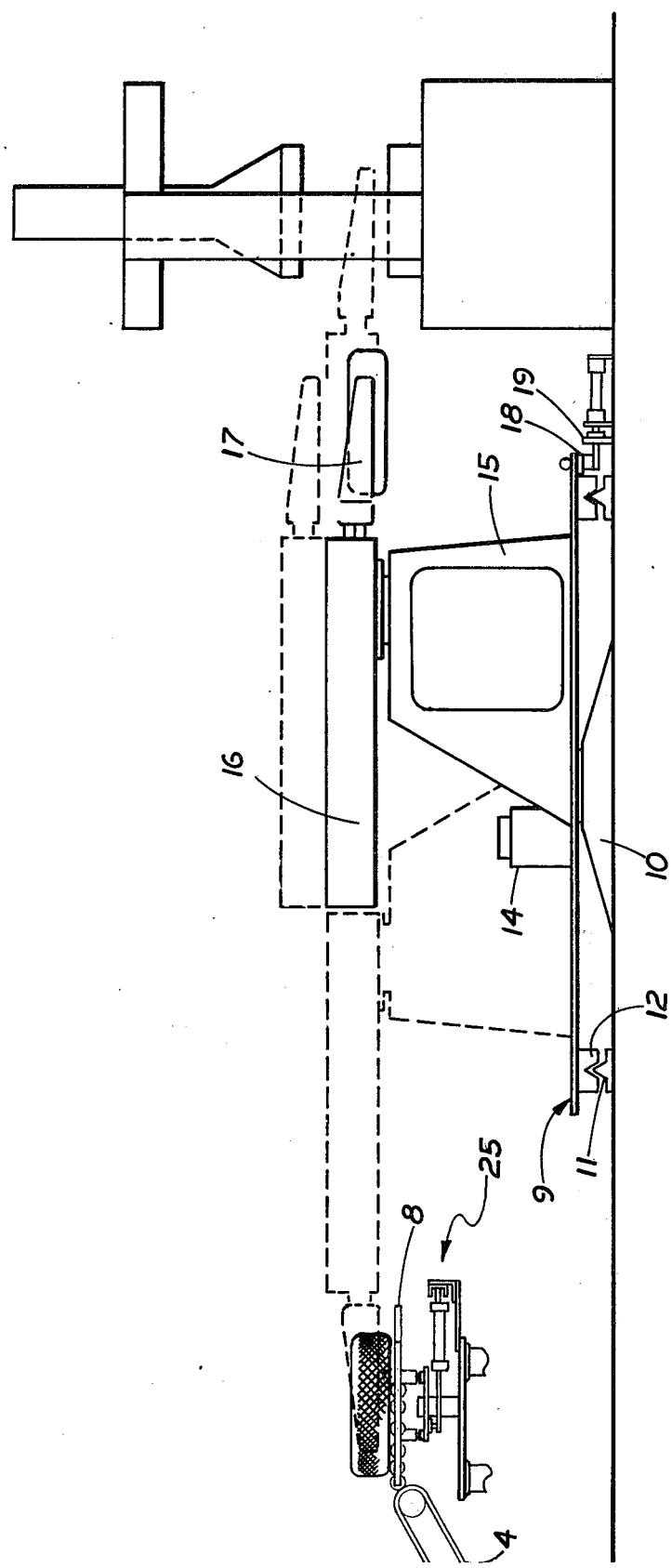

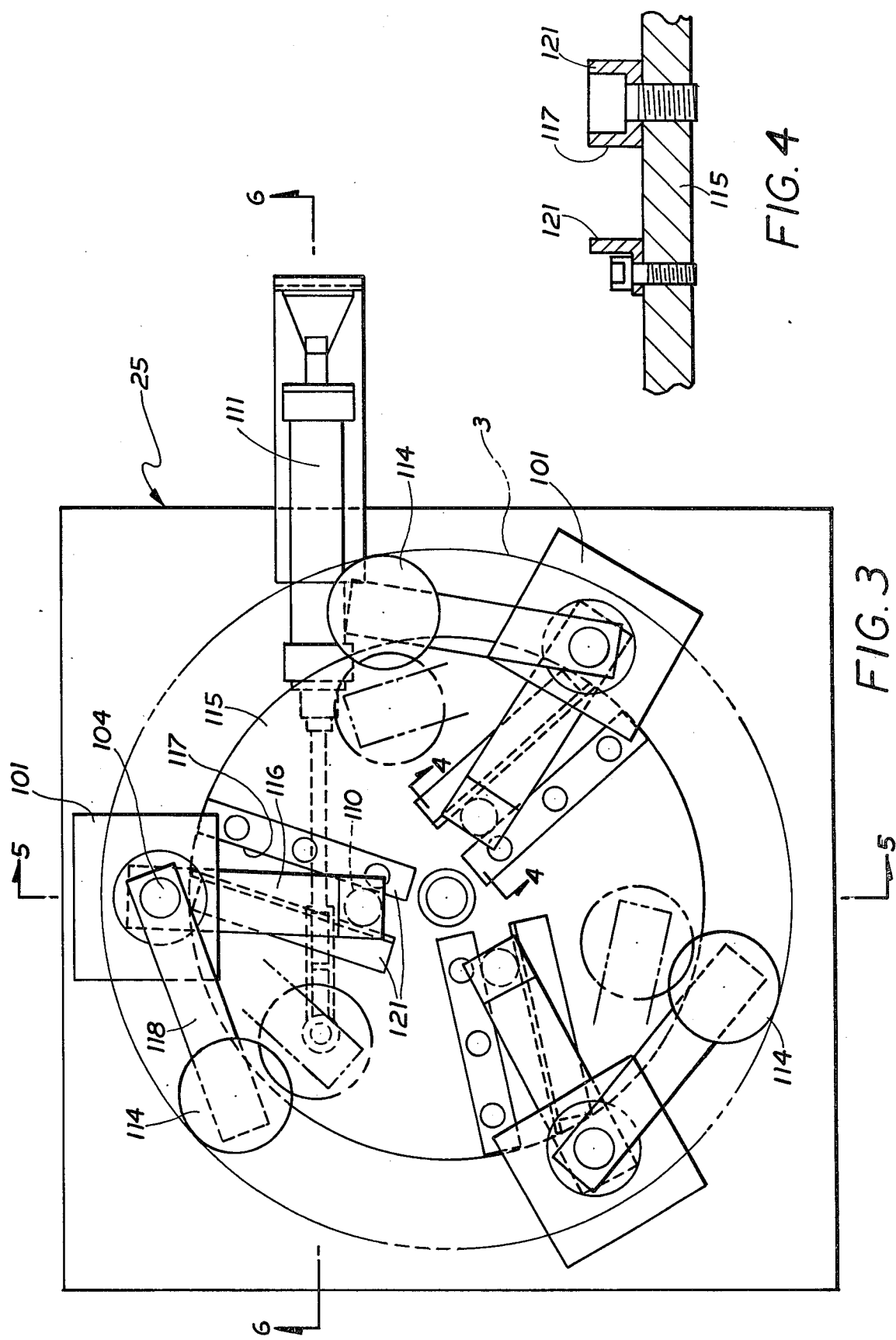

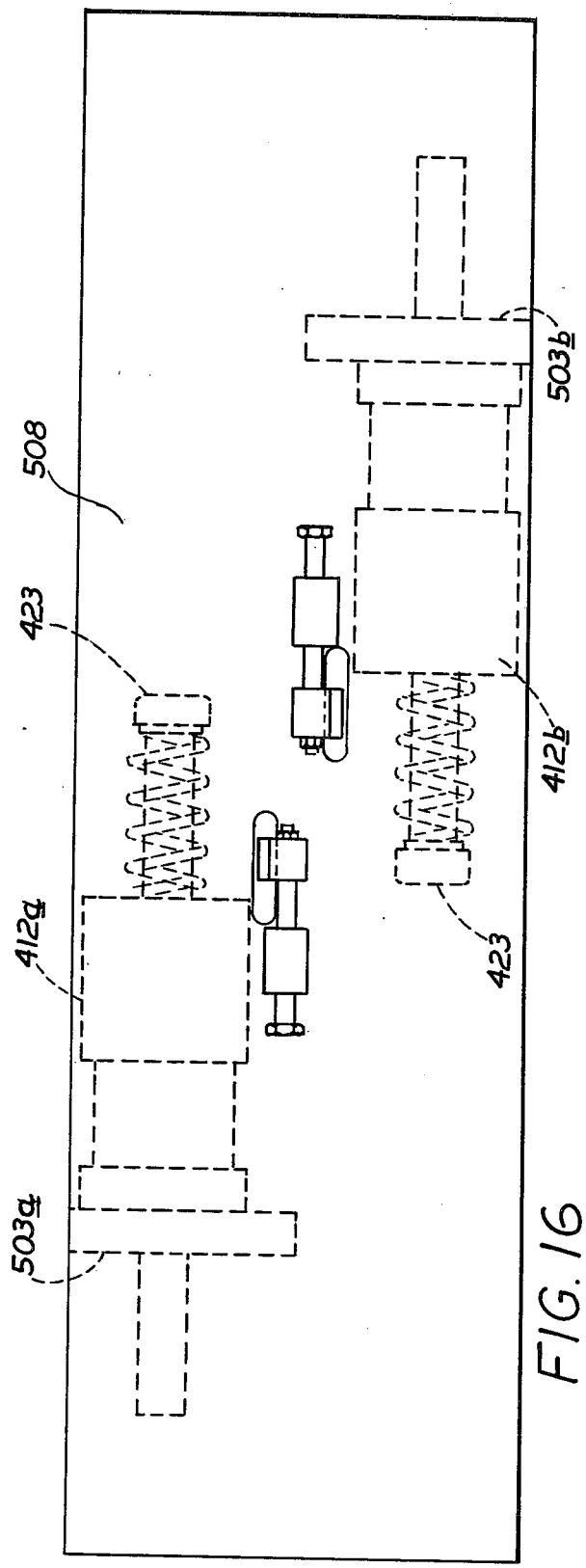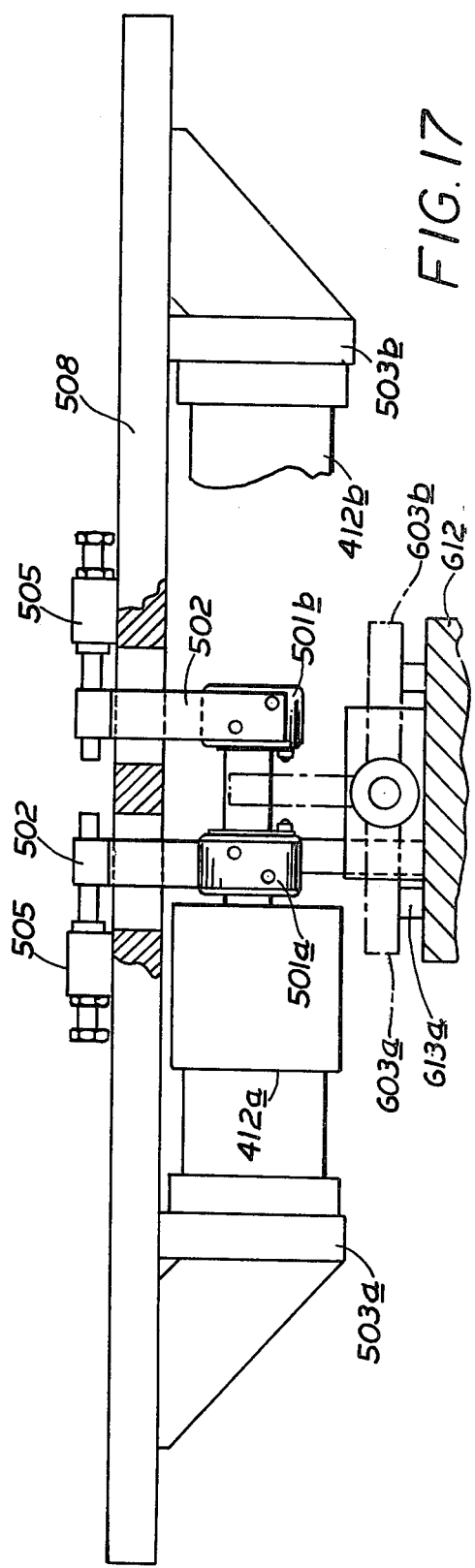

MATERIAL-HANDLING APPARATUS

The present invention relates to material-handling apparatus and, in particular, relates to apparatus for handling automobile tires in recapping plants.

Prior to the present invention, handling tires in recapping plants has required considerable manual labor and, accordingly, has required the presence of personnel in the vicinity of the recapping operations where high temperatures and unhealthy gases and other dangerous conditions prevail. Furthermore, manual handling of heavy automobile tires is difficult for the personnel and should preferably be avoided. Inasmuch as recapping machines work at extremely high pressures and temperatures and are subject to explosions, it is dangerous to have workmen in the vicinity of the recapping machines during their operation.

Generally, recapping plants operate to recap automobile tires of various sizes, as required by the different types of automobiles. Normally, a single recapping machine is adjusted to recap tires of a given size and this machine is operated continuously to produce the requirements for that particular size of tire. Furthermore, when loading the machine, it is preferable to insure that the tire is properly centered in the machine when it is loaded so as to minimize the necessity for adjusting the tire after or during operation of the machine.

Remote-controlled material-handling devices which may have been proposed for use in connection with tire recapping machines have not been regarded as practical but have only been theoretical solutions which were not developed into an operational machine. The present invention provides a practical material-handling device which may serve a multiplicity of recapping machines, thereby permitting operation of the handling apparatus by remote control and with modern computer-controlled operations. A primary object of the present invention is to eliminate the need for manual handling of the tires in a recapping plant.

More specifically, the present invention permits the handling of a multitude of sizes of tires in a single handling apparatus.

The present invention permits a single handling apparatus to service a plurality of recapping machines each of which may be effective to recap a different size of tire. More specifically, the present invention provides material-handling apparatus in which a single conveyor is operated to transfer tires from a plurality of different sources to a cluster of recapping machines. Loading apparatus is provided to load the machines in succession, the apparatus being effective to center the tire and properly load the same regardless of the different size the machine is set to accommodate.

In the preferred embodiment of the invention, the handling apparatus is programmed to selectively load the conveyor with tires in a sequence corresponding to the loading sequence required by the cluster of recapping machines. The loading apparatus is also operable to unload the recapping machines and transfer the recapped tires to a discharge conveyor so as to permit reloading the recapping machine after completion of each operation.

All of the objects of the invention are more fully set forth hereinafter with reference to the accompanying drawings, wherein:

FIG. 2 is a view in side elevation taken on the angular section line 2—2 of FIG. 1, showing the relationship of the feed conveyor, transfer unit and recapping machine;

FIG. 3 is a plan view of the fixing or centering unit of the apparatus shown in FIG. 1;

Figure 1:
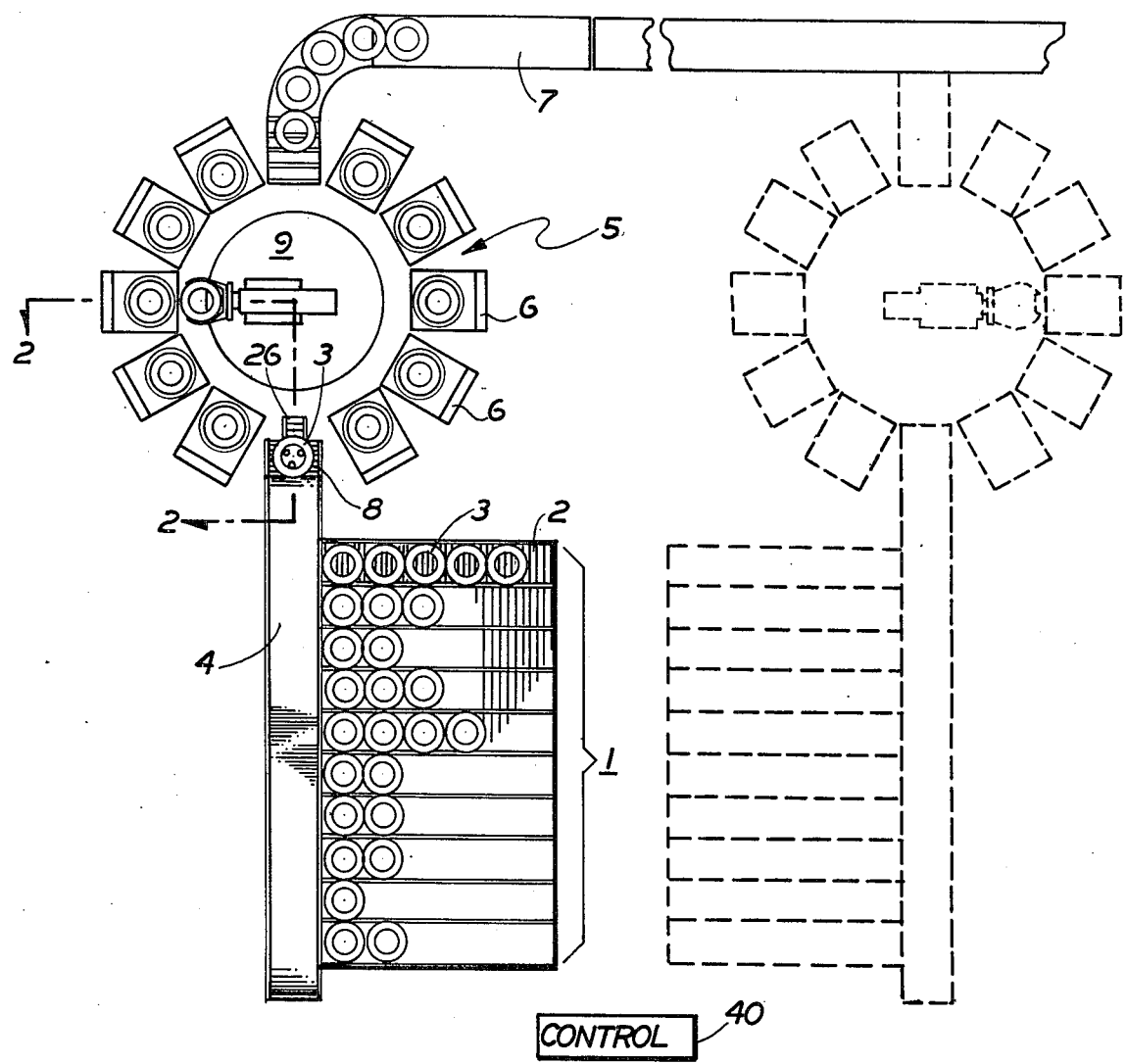
FIG. 1 is a plan view of a tire recapping plant embodying the present invention.
Figure 5:
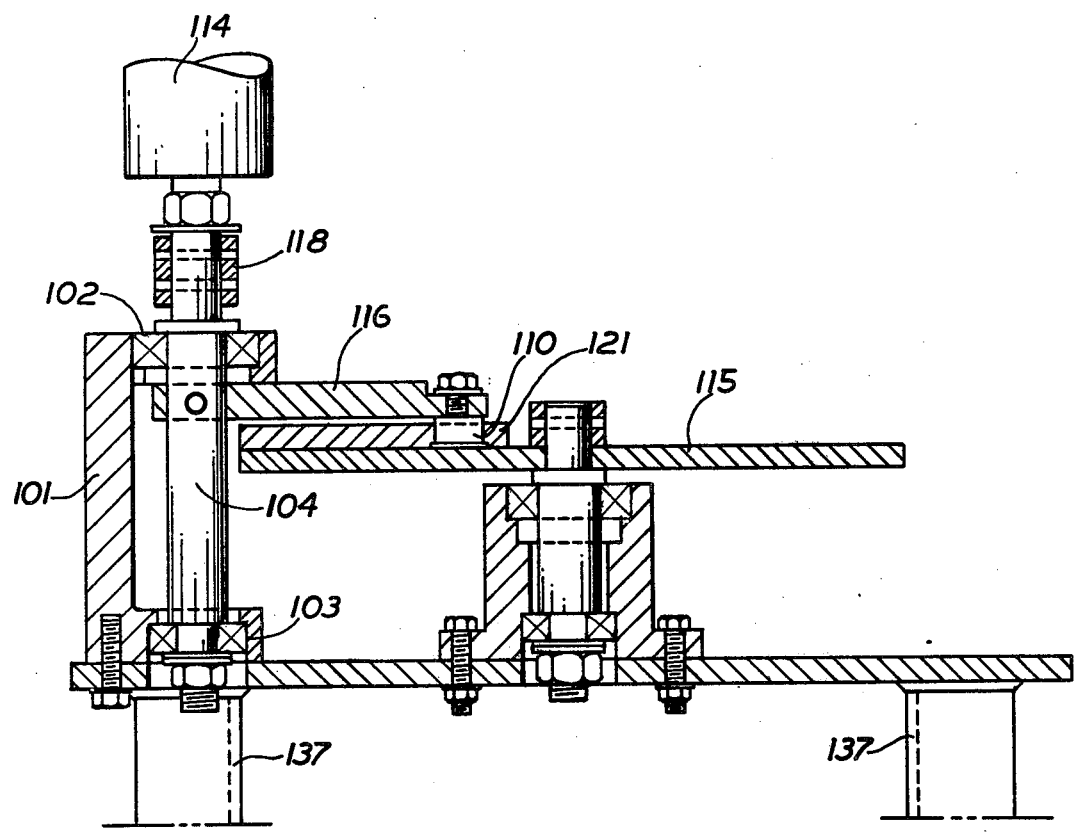
Figure 6:
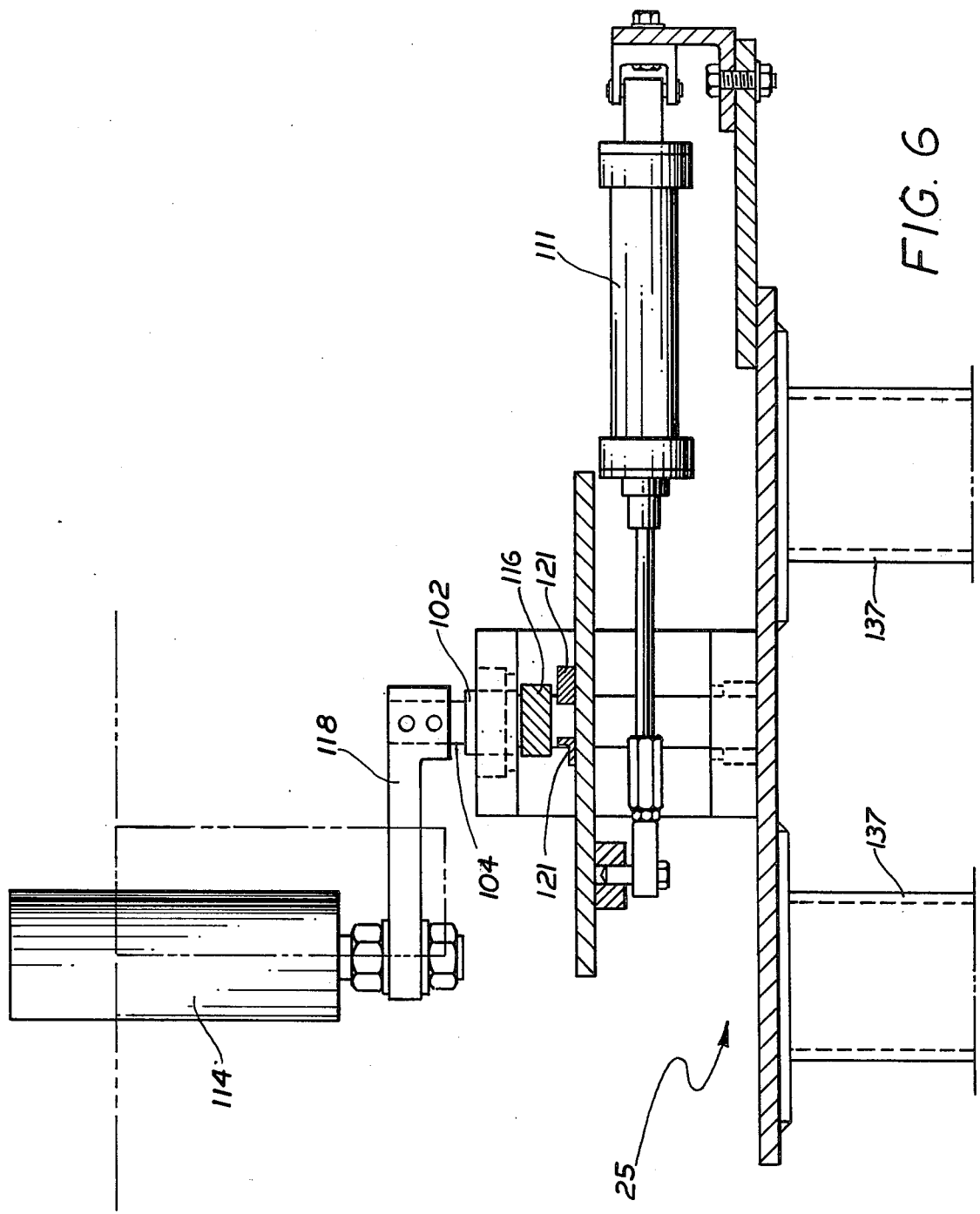
Figure 7:
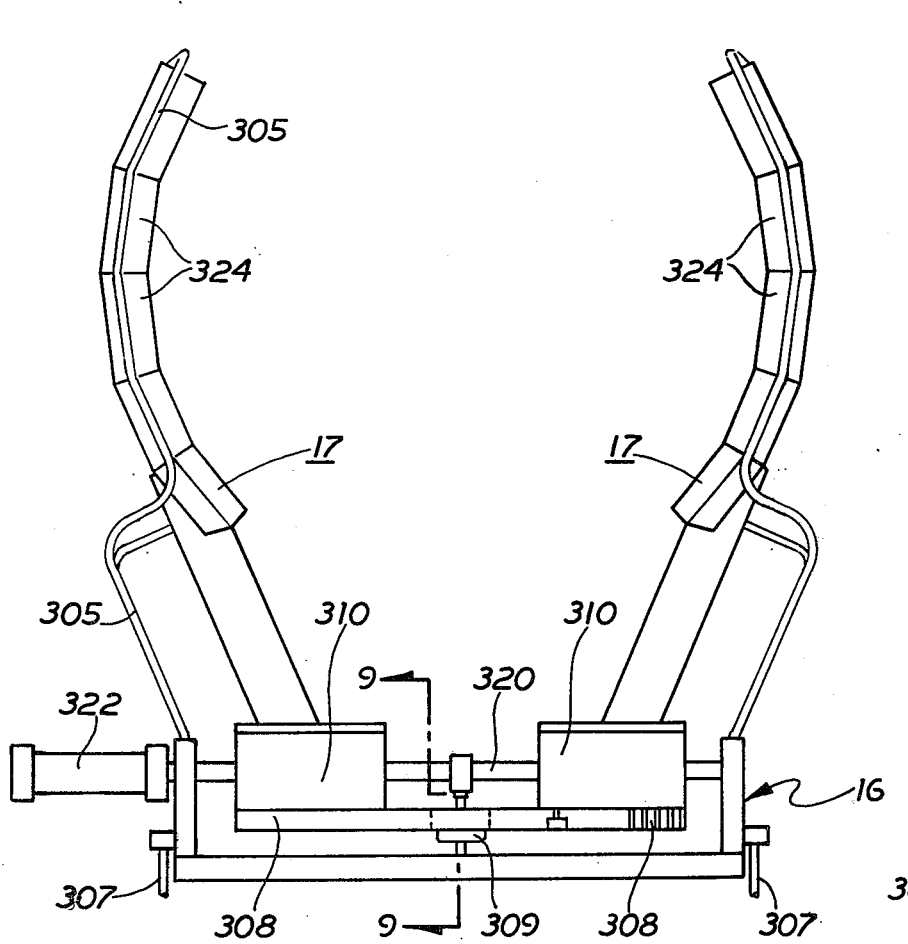
Figure 8:
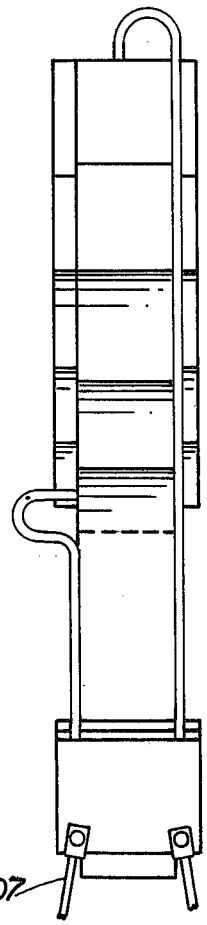
Figure 9:
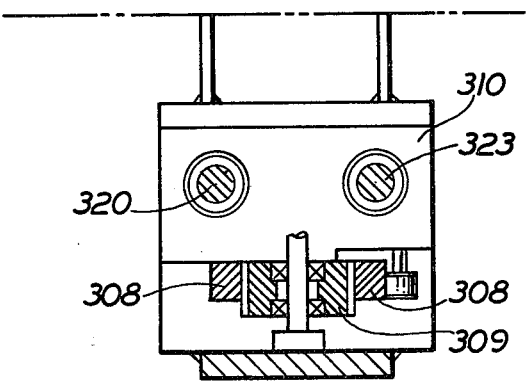
Figure 10:
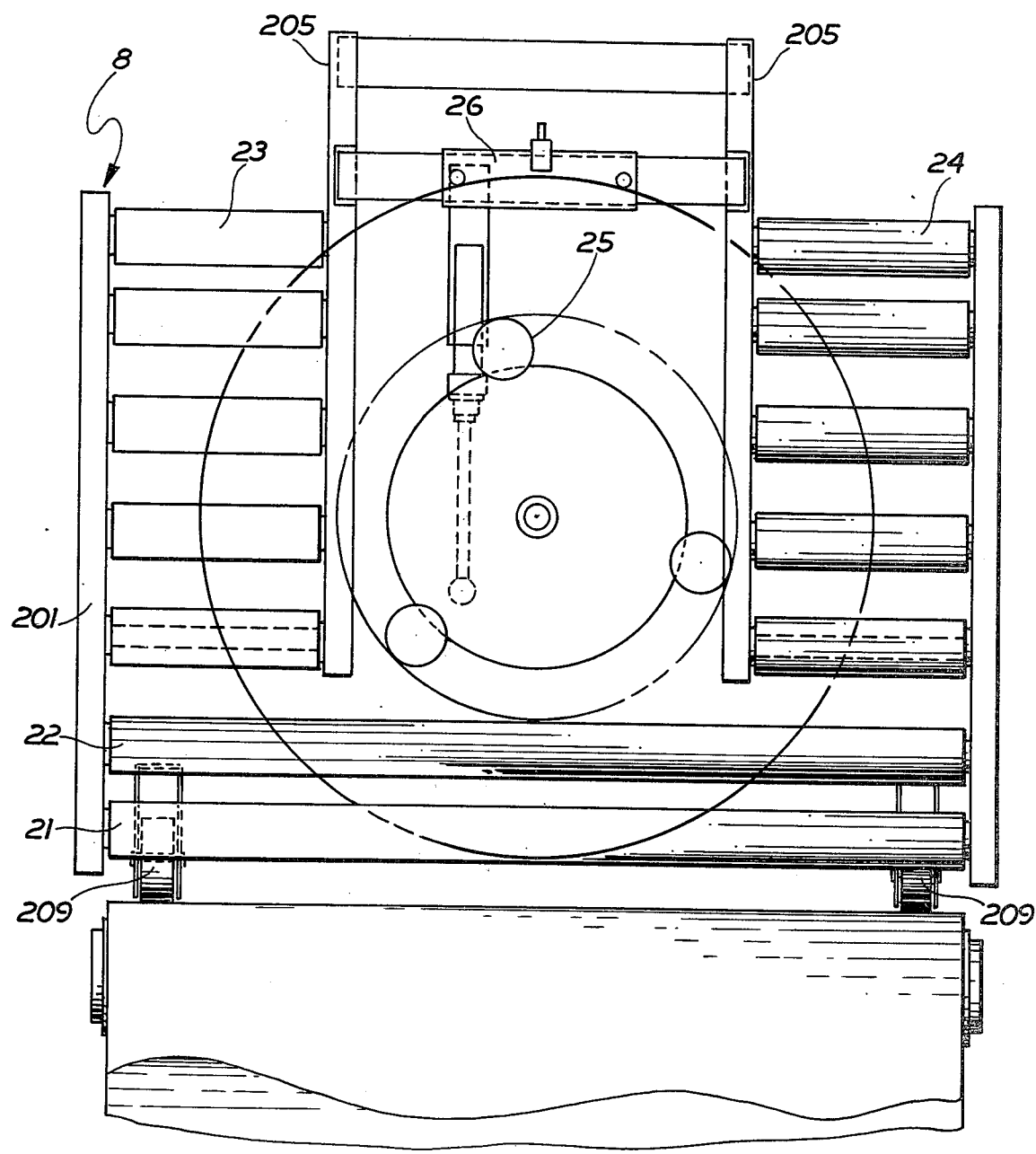
Figure 11:
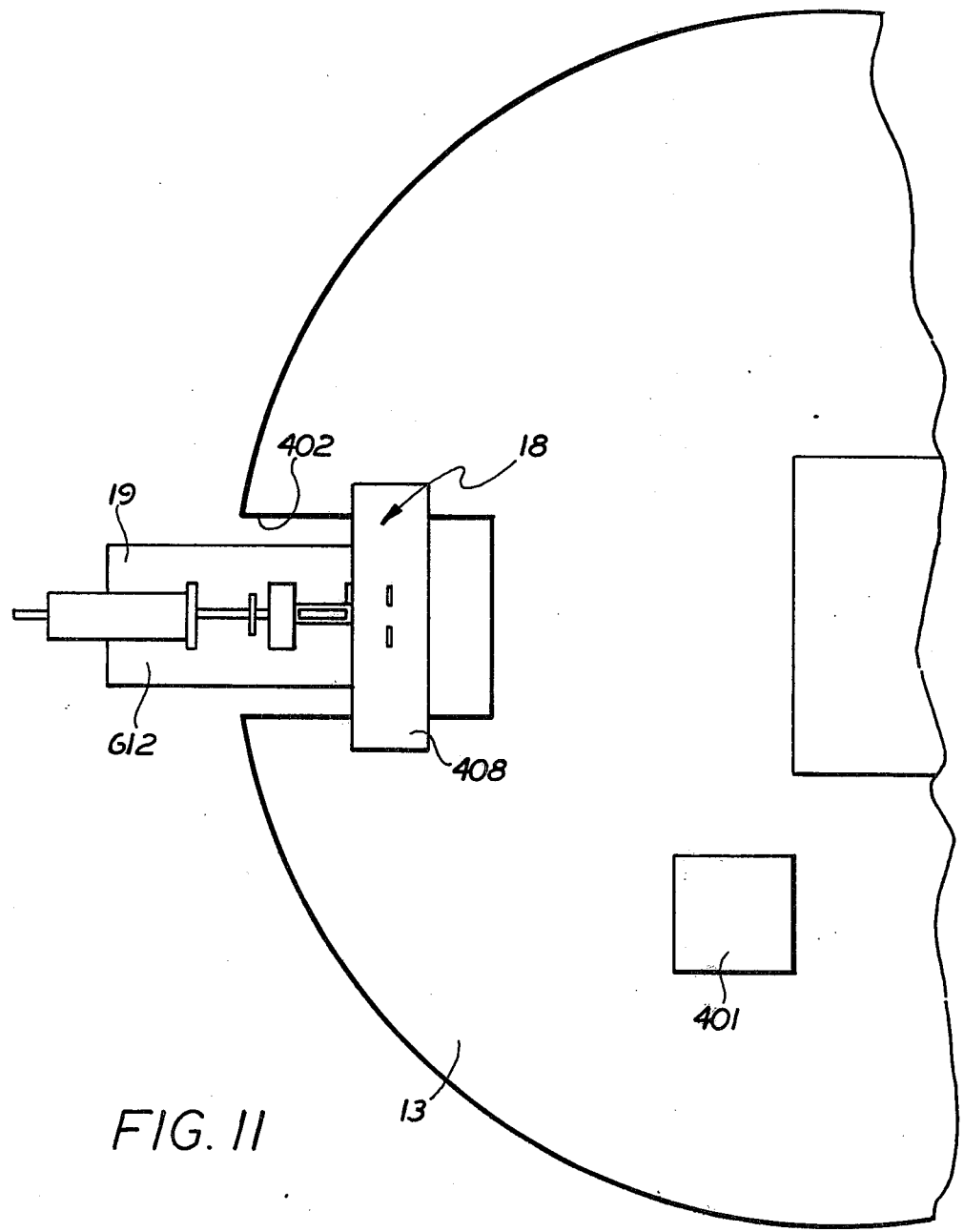
Figure 12:
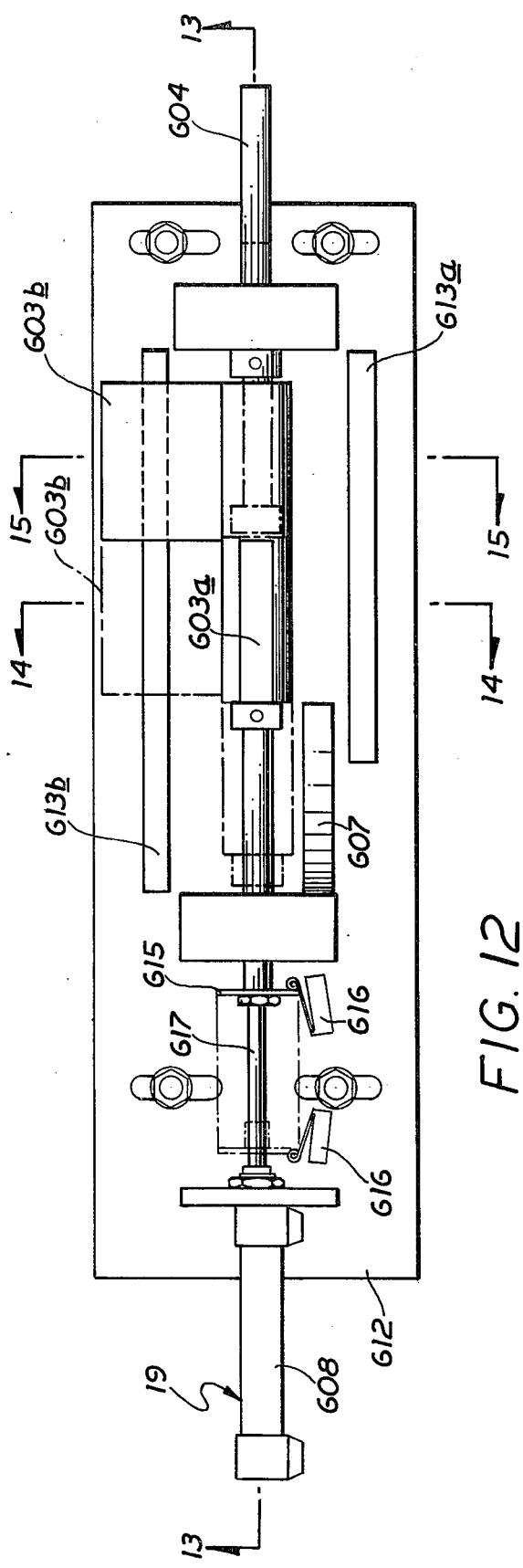
Figure 13:
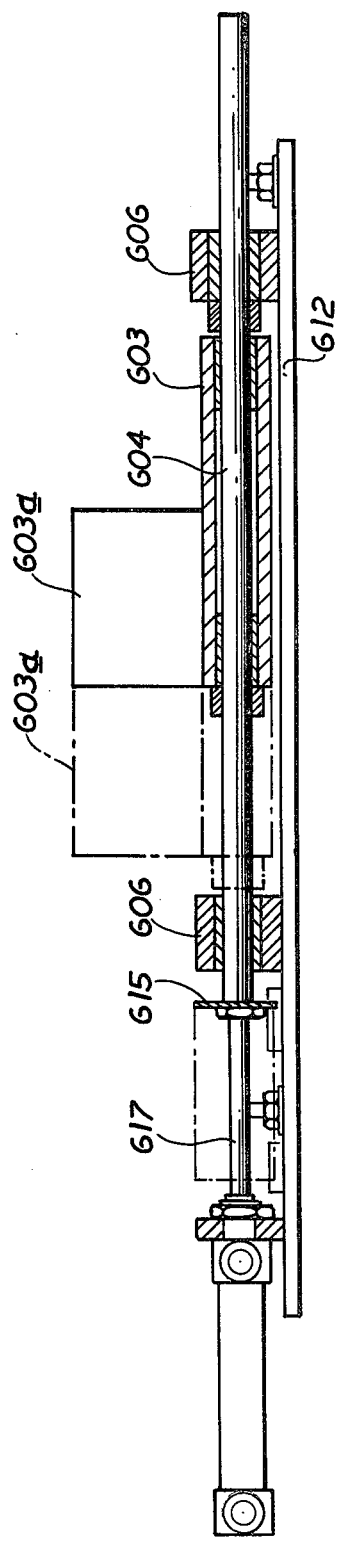
Figure 14:
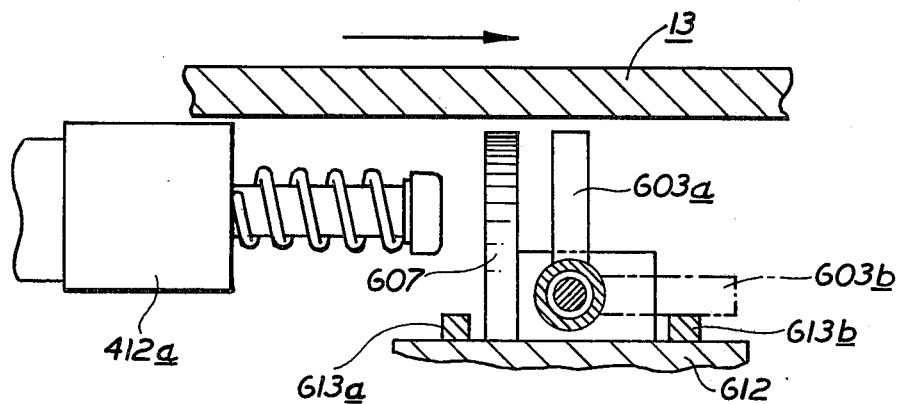
Figure 15:
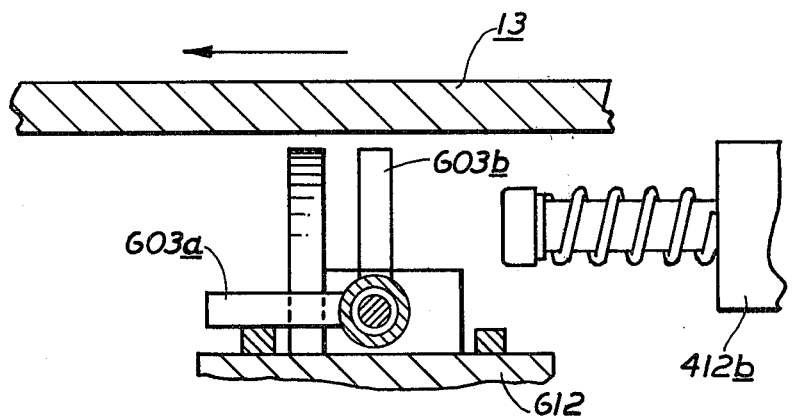
Figure 19:
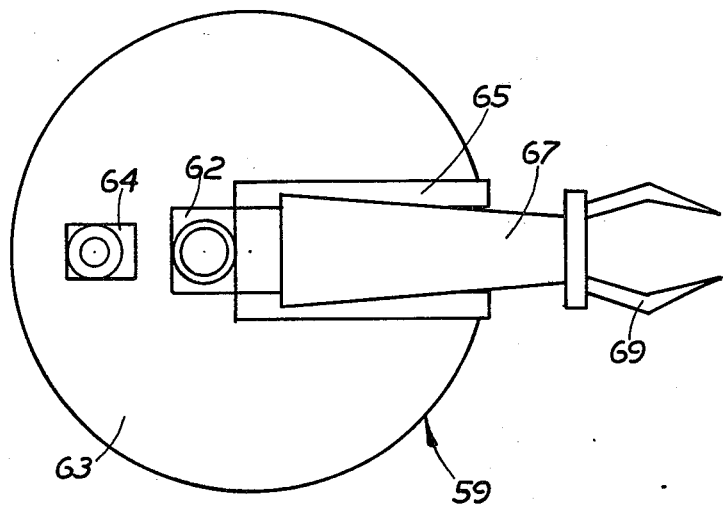
Figure 18:
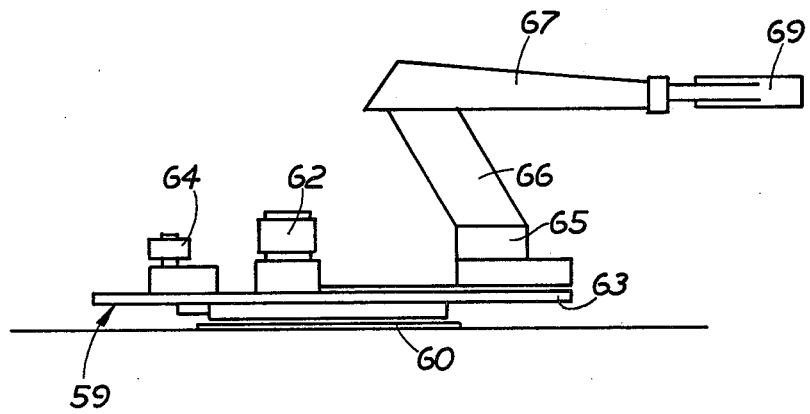
Figure 20:
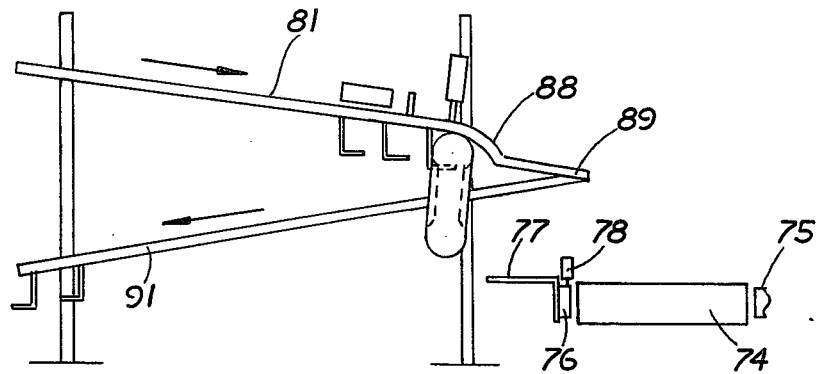
Figure 21:
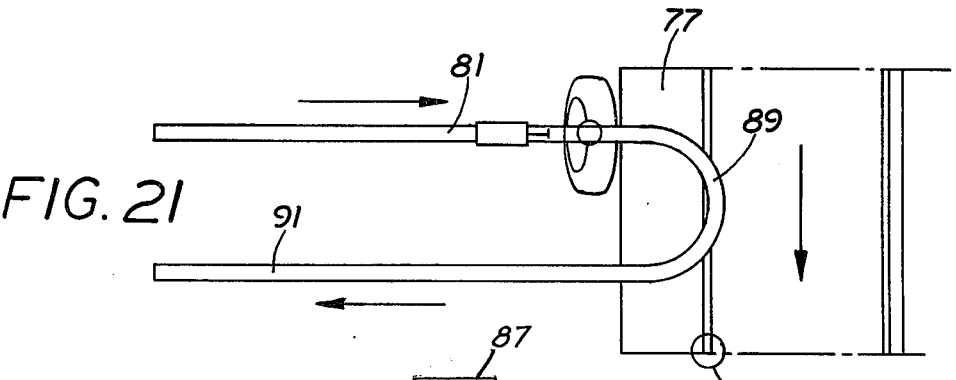

FIGS. 4, 5 and 6 are sectional views taken on the lines 4—4 and 5—5 and 6—6 of FIG. 3;

FIG. 7 is a plan view of the gripping arms shown in FIGS. 1 and 2;

FIG. 8 is a view in side elevation of the arms shown in FIG. 7;

FIG. 9 is a sectional view taken on the line 9—9 of FIG. 7;

FIG. 10 is a plan view of the feed conveyor which cooperates with the fixing unit of FIG. 3;

FIG. 11 is a fragmentary plan view of the turntable of the transfer unit which mounts the gripping arms of FIG. 7;

FIGS. 12 and 13 are views in plan and longitudinal section, respectively, of stationary stop means having displaceable wings cooperable with the turntable showing the activated position in full lines and the inactive position in broken lines;

FIGS. 14 and 15 are views in transverse section showing the wings of the stationary stop means in opposite limit positions;

FIGS. 16 and 17 are views in plan and elevation, respectively, of the damping means mounted on the turntable for cooperation with the displaceable wings of the stationary stop means of FIGS. 12-15;

FIGS. 18 and 19 are views in elevation and plan, respectively, of an alternate embodiment of the transfer unit;

FIG. 20 is a diagrammatic view of an alternate supply magazine in the form of an overhead conveyor for feeding the feed conveyor;

FIG. 21 is a plan view of the apparatus shown in FIG. 20; and

Figure 22:
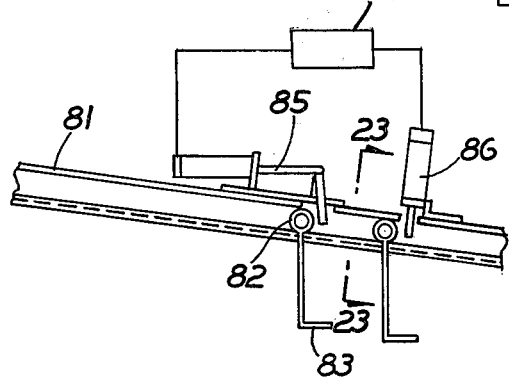
Figure 23:
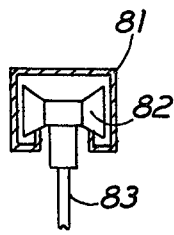

FIGS. 22 and 23 are fragmentary sectional views illustrating details of apparatus shown in FIGS. 20 and 21.

Referring now to the drawings and, more particularly, FIGS. 1, 2 and 3 thereof, the recapping plant comprises a cluster 5 of recapping machines 6 arranged in a circle, for example with the separate stations positioned so that there is an angular distance between the machines of 30°. The machines are fed with tires by a single conveyor 4 which is arranged to receive tires 3 from the supply magazine or source 1 comprising a plurality of parallel horizontal and non-driven roller ways 2. Each roller way will supply a single size of automobile tire 3 disposed flat upon the rollers as shown. Preferably, the ways 2 are arranged at right angles to and terminate at the belt conveyor 4 which feeds the cluster 5 of recapping machines.

As shown in FIG. 1, the belt conveyor 4 terminates between two recapping machines in the cluster so as to introduce the tires into the cluster. Diametrically opposite the conveyor 4, an outgoing conveyor 7 is similarly situated to discharge recapped tires from the cluster. In accordance with a preferred embodiment, the magazine 1 and/or the conveyor 4 are arranged at a comparatively low level, but the terminal of the conveyor 4 in the cluster 5 of recapping machines is inclined upward, for example at an inclination of 30° and for a distance of 2 meters, and operates to discharge the tires onto a roller conveyor or roller way 8.

In accordance with a preferred embodiment, the roller way 8 has a pair of driven entrance rollers 21 and 22 which extend across the full width of the conveyor 4. Beyond the driven entrance rollers 21 and 22 are a plurality of other non-driven rollers. Preferably, the non-driven rollers are arranged in two side formations 23 and 24, which leave an area between them entirely free. Within this area, a fixing unit 25 is mounted below the level of the rollers 23 and 24. The fixing unit is operable to engage the tires on the horizontal roller ways 8 and properly center them for pickup and transfer to the recapping machine at a selected station (see FIG. 10).

Diagonally opposite the horizontal roller ways 8, the outgoing conveyor 7 is positioned for discharging recapped tires to inspection, further treatment, or storage, as the case may be. The outgoing conveyor 7 consists of one or more roller ways arranged in sequence, at least one of which is driven in order to carry the recapped tires away from the cluster of recapping machines. As indicated in FIG. 1, the outgoing conveyor may serve not only the recapped tires from the cluster 5 but also may serve additional clusters of recapping machines.

In the center of the area encircled by the recapping machines 6, and the incoming and outgoing conveyors 8 and 7, there is arranged a slave robot or transfer unit 9 for transferring the tires from the incoming conveyor to any one of the several recapping machines 6, and, likewise, to transfer a tire from any one of the recapping machines 6 to the discharge conveyor 7. The transfer unit 9 comprises a frame 10 centered within the cluster of recapping machines and having a circular supporting rail 11. A turntable 13 is mounted on the rail 11 by wheels 12 which permit the turntable to rotate about the center of the circular rail. The table has a turning motor 14 and an auxiliary frame 15 which supports a gripping mechanism 16. The gripping mechanism 16 has gripping arms 17 which are adapted to embrace the outer perimeter of the tire. As shown by the broken lines in FIG. 2, the gripping mechanism may be displaced vertically between upper and lower limit positions. In the upper limit position, the gripping arms may be extended and retracted radially of the turntable 13 and the gripping claws may be activated toward or away from each other to pick up or discharge the tires, as described fully hereinafter.

With the tires engaged by the gripping mechanism, the turntable may be rotated to position the tire at any one of the stations of the cluster. To this end, suitable stop means 18 on the turntable is provided to cooperate with stationary stop means 19 at each station of the cluster. In accordance with a preferred embodiment, at least one of these cooperating stop means includes a hydraulic or a pneumatic damper or dash pot which softly slows down the turning movement of the turntable 13 and the transfer unit 9 as the gripping mechanism approaches the selected station where the turntable will be stopped. The details of this indexing mechanism for the turntable will be described more completely hereinafter.

The fixing unit 25 for positioning the tires on the roller table 8 is described in greater detail in connection with FIGS. 3–6. In these figures, the unit 25 comprises a frame member having a plurality, in the present instance three, fixed bearing housings 101 having contact bearings 102 and 103 mounting an axle 104. Intermediate the bearings 102 and 103, a crank arm 116 is pinned to the axle 104. At its free end, the arm 116 mounts a cam roller 110 which is guided in a guideway 117 between a pair of guide bars 121 on a rotor 115. Above the bearing 102, the axle 104 mounts a second crank 118 having positioning rollers 114 at its free end. Thus, by rotating the rotor 115, the rollers 114 are displaced inwardly and outwardly by the camming action of the roller 110 in the guideway 117. The rotor 115 is actuated by a cylinder 111. In the illustrated embodiments, the rollers 114 move outwardly when the piston of the cylinder 111 is pushed outward and are moved inwardly when the piston is retracted. As there are three rollers arranged equidistantly around the circumference of the rotor 115, the rollers 114 engaging the interior of the tire will center it concentric with the rotor 115 regardless of the internal diameter of the tire.

The centering unit 25 is arranged to be raised and lowered. When a tire is displaced onto the roller table 8, as shown in FIG. 1, the unit 25 is in its lower limit position. When, on this table, the tire bumps against a stop 26, which, for example through a microswitch and the columns 137, elevates the fixing unit 25. When the rollers 114 are at the level of the interior of the tire, the piston of the cylinder 111 is actuated to move the rollers outwardly and center the tire thereon. Alternatively, the fixing unit may be activated by a control panel 40 which may also index the transfer unit 9 into registry with the roller table 8. When the transfer unit 9 engages the outer periphery of the tire, the rollers 114 are displaced radially inward to disengage the tire and the unit 25 is lowered below the table 8. The fixing unit 25 is then ready again for the same cycle with the next tire, regardless of its inner and outer dimensions.

As shown in FIG. 10, the roller table 8 comprises a main frame 201 which mounts the entrance rollers 21 and 22. The entrance roller 21 is driven by rubber wheels 209 which bear against the roller 21 and this rotary motion is transmitted to the roller 22. Beyond the frame 201, rearwardly extending frames 205,205 mount a plurality of idler rollers in two side formations, 23 and 24. In this fashion, the driven rollers 21 and 22 are effective to advance the tire onto the idler rollers 23 and 24 against the stop 26 so that the tires span between the roller formations 23 and 24 leaving the interior of the tire accessible to the fixing unit 25 mounted therebelow. Thus, the roller table supports the tire at its rim, leaving the central core of the tire substantially free. Displacement of the tire against the stop may initiate operation of the fixing unit either directly or through the control panel 40 (see FIG. 1).

As shown in FIGS. 7, 8 and 9, the gripping mechanism 16 has means for displacing the gripping arms 17 toward and away from one another so as to engage and release the tire positioned therebetween. Preferably, the gripping arms 17 comprise a plurality of hollow segments 324 which are interconnected at angles relative to each other so that the interior holding surface of the arms 17 remains substantially unchanged in size for various diameters of the products to be gripped. The angular relationship of the segments positions the tire or other product centrally within the centerlines of the gripping arm. In order to enable the gripping arms to function properly with tires fresh from the recapping machines, the arms may be cooled by means of water or another coolant and, to this end, metallic braided hose 305 is connected to the gripping arms. The coolant is supplied to and discharged from the gripping arms through suitable connections at 307.

The gripping arms 17 are mounted for lateral displacement on slides 310 (see FIG. 9), each slide having a rack 308 on the surface facing the center of the turntable. The racks from the two arms 17 extend longitudinally past one another and are each in meshing engagement with a freely rotating pinion gear 309. The slides 310 are guided on axles 320 and 323 and are operable to be displaced by a pneumatic cylinder 322 operating on one of the slides. Displacement of one slide, through the racks and pinion, effects corresponding displacement of the other slide. In this manner, equal and opposite movement of the two gripping arms is achieved to insure that the gripped product will be properly centered in relation to the gripping unit regardless of the product's dimension. The actuation of the cylinder 322 may be effected automatically by limit switches responsive to the radial extension of the arms 17 relative to the table or semiautomatically by the control panel 40. As noted above, the gripping arms may be cooled by the water introduced through the hoses 305 and 307 and the arms are readily detachable and attachable by means of screws which permit quick exchange of gripping arms or claws when needed.

FIG. 11 illustrates the turntable 13 in plan and shows the plate 401 for mounting the turning motor 14, the opening 402 for a mounting plate 508 in which the stop means 18 is mounted. The stop means 18 includes a damping unit 413 which includes two dampers 412a and 412b facing in opposite directions and cooperable with stationary stop means 19 at each station of the cluster to accurately arrest the rotation of the turntable 13 in proper registry with the desired station within the cluster 5.

The damping unit is shown in greater detail in FIGS. 16 and 17, and comprises a mounting plate 508 designed to be mounted in the turntable 13 substantially flush with the surface of the turntable 13. The mounting plate has on its underside brackets 503a and 503b which are offset from one another radially of the turntable and which mount the dampers 412a and 412b, respectively. It is noted that the dampers 412 may be in the form of dash pots disposed generally circumferentially of the turntable 13 and include a bumper portion 423 at the free end. Each dash pot travels in a separate circular path as the turntable rotates about its center. Alongside each dash pot 412 spaced rearwardly from the bumper end 423, a sensor switch 501 is positioned for engagement with the stationary stop means 19. One sensor switch 501a is positioned adjacent the dash pot 412a and the other sensor switch 501b is positioned adjacent the dash pot 412b. The sensor switches 501a and 501b are mounted on arms 502 which extend through the plate 508 and are adjustably anchored by adjusting blocks 505 on the upper surface of the plate 508. The blocks 505 permit accurate adjustment of the sensor switches 501a and 501b so that when the switches are actuated, the turntable 13 is stopped precisely in registry with the desired station.

In the drawings, a hydraulic damper is shown which has a spring biasing the bumper portion 423 away from the body of the damper and in which the body of the damper includes orifices or throttle passages for damping fluid therein to control the restriction against movement provided by the bumper portion 423. Furthermore, the adjustment shown in the drawing provides that the damper bumper 423 is engaged a substantial distance prior to engagement of the sensor switch 501, but it should be understood that the adjustment may be made so that the delay between the engagement of the bumper and the engagement of the sensor switch may be reduced to any desired extent. Actuation of either sensor switch 501 signals the turn motor 14 to cease rotation of the turntable 13 so that the turning movement of the turntable 13 is arrested precisely at the desired indexing station.

Stationary stop means 19 is provided at each indexing station in the cluster. Each stop means may be operated between active and inactive conditions by adjustments at the control panel 40 or by a predetermined program incorporated in the panel 40. In this fashion, a stop means at a selected station may be activated to arrest the turntable in registry with that station. The stationary stop means 19 is shown in greater detail in FIGS. 12-15. The stop means, designated generally by the reference character 19, includes a mounting plate 612 which is adjustably mounted on the floor in a position generally radial to the turntable 13 as indicated in FIGS. 2 and 11. An actuating pneumatic cylinder 608 is disposed radially to the turntable and has a piston rod 617 which has a stop washer 615 at its outer end. Microswitches 616 are provided at the inner and outer limit positions of the piston rod to arrest the movement of the piston at its opposite limit position, the full-line position in FIGS. 12 and 13 being the activated position where the piston is extended inwardly toward the axis of the turntable 13. The piston 617 carries an axle 604 which is both longitudinally and rotationally slidable in bearing blocks 606,606 projecting upwardly from the mounting plate 612. The axle 604 carries an elongated sleeve 603 having stop wings 603a and 603b thereon which are respectively mounted to cooperate with the dash pots 413a and 413b and the sensor switches 501a and 501b. The sleeve is frictionally engaged with the shaft by friction bearings which permit forceful rotation of the sleeve 603 and the axle 604. The frictional engagement prevents inadvertent rotation of the sleeve.

As shown in FIGS. 14 and 15, the wings 603a and 603b are disposed at right angles to one another so that when one of the wings is perpendicular to the mounting plate 612, the other of the wings is parallel thereto. The plate 612 has stop bar 613a which cooperates with the wing 603a to position the wing parallel to the plate 612 in one limit position and a complementary stop bar 613b which cooperates with the wing 603b to position that wing parallel to the plate 612 in the other limit position.

In the activated position shown in full lines in FIGS. 12 and 13, the wings 603a and 603b are in the operative position to cooperate with the damper means to arrest the turntable in registry with the indexing station. The wing 603a underlies the circle of movement of the dash pot 413a about the center of the turntable 13 and the wing 603b underlies the circle of movement of the dash pot 413b about the center of the turntable 13. When the cylinder 608 retracts the piston 617 to displace the shaft 604 and the sleeve 603 to the broken-line position, the upright wing 603a is displaced alongside the turn wedge 607 out of registry with the path of the dash pot 413a, and the wing 603b which is parallel to the plate is displaced out of registry with the path of the dash pot 413b into registry with the path of the dash pot 413a. However, since the wing 603b is parallel to the plate, it passes under the dash pot 413a without engaging it. In order to insure that the wing 603b is disposed parallel to the plate 612 when the piston rod 617 is retracted to its retracting position, the turn wedge 607 is provided to forcibly rotate the wing 603a to its upright position, in the event that it is situated in its parallel position.

In operation, with the elements in the position shown in FIGS. 12 and 13, the wing 603a is upright and the wing 603b is parallel to the plate 612. When the turntable is rotating clockwise relative to the floor, clockwise rotation of the turntable causes the bumper 423 of the dash pot 413a to impinge against the upright stop wing 603a and the wing 603a thereupon slows the rotation of the turntable 13 and ultimately arrests the rotation when the wing 603a engages the sensor switch 501a. The turntable is thereby stopped in precise registry with the indexing station where the cylinder 608 has extended the stop wings 603a and 603b. When the operation at that station is completed, the cylinder 608 is actuated to retract the piston 617 and displace the wings 603a and 603b to the broken-line position of FIG. 13. This moves the wing 603a out of the path of the bumper 423, releases the sensor switch 501a and permits the turntable to rotate. The table continues to rotate until it is stopped by one of the wings 603 at a subsequent station. The control unit 40 may be programmed to automatically determine the sequence activation of the stops 19, but suitable overriding controls are provided for emergency situations.

If the turntable is rotating counterclockwise, the stationary stop means is effective to arrest the turntable at the same indexing station. To this end, the counterclockwise rotation of the turntable causes the projecting wing 603a to approach the dash pot 413a from the bracket end at 503a instead of from the bumper end at 423. As shown in FIGS. 16 and 17, the bracket 503a provides a sloping surface which engages the opposite side of the wing 603a and causes the sleeve 603 with the wings attached to rotate 90° so that the wing 603a engages upon the stop bar 613a. This rotation of the sleeve 603 rotates the wing 603b to the upright position where it then is in position to intercept the bumper 423 of the dash pot 413b and ultimately engage the sensor switch 501b. This in turn arrests the turntable precisely at the desired location of the indexing station. The wings 603a and 603b are therefore in the position shown in FIG. 15 with the wing 603a parallel to the plate 612 and the wing 603b perpendicular thereto. The stopping motion operates in the same fashion in a counterclockwise direction, and when it is desired to resume operation, the piston 617 may be retracted to displace the wing 603b out of the path of the bumper 413b. In the course of the displacement of the sleeve 603 towards the cylinder 608, the turning wedge 607 engages the wing 603a and turns the stop wing 603b to its position parallel to the plate 612 and to a position underlying but out of the path of the dash pot 413a.

It is not necessary to activate the cylinder 608 at the end of the operation if the direction of rotation of the turntable is reversed. In such a case, the wing 603b is left elevated in its perpendicular position and the stationary stopping means 19 remains in condition to arrest the turntable on its next pass past the indexing station. With the wing 603b elevated, the opposite direction of rotation continues until the dampers pass into registry with the stationary stop means, the bracket end of the damper 413b will then engage the wing 603b and displace it to its parallel position, elevating the wing 603a which will then engage the bumper 423 of the dash pot 413a.

Preferably, the timing motor 14 is of a type which is arrested when the power is cut off. Alternatively, a brake may be coupled to the motor to be applied when the power to the motor is cut off.

With the foregoing in mind, a typical operation of the material-handling apparatus for the recapping machines may be as follows.

When the plant is started in operation, all of the recapping machines are deemed to be empty and in condition to initiate operation on a particular size of tire. An operator will select the proper size tire from the proper conveyor 2 of the magazine 1 and load it onto the conveyor belt 4 which transfers that tire to the roller table 8. This may be done manually or by remote control of the individual roller tables 2. Upon reaching the table 8, the tire engages the stop 26 which activates the fixing unit 25 either directly or through the control panel 40. The fixing unit 25 centers the tire on the roller table 8 and is then retracted below the table. The transfer unit 9 is then operated to place that tire in its proper recapping machine. The next recapping machine is similarly loaded with a tire from the proper one of the roller conveyors 2 and this operation is repeated until all of the machines are loaded, the sequence of tire sizes being determined then by the sequence of loading of the various machines in the cluster 5. The necessary recapping time may be approximately 20 minutes for each tire. When all the recapping machines are loaded, automatic control may take over. Since the sequence of loading and unloading is maintained the same, the feeding of the tires to the conveyor belt 4 may be programmed in the control panel to provide the desired sequence.

The automatic control then is activated when the first machine completes its recapping operation. When this machine is finished, it opens and indicates that a tire of the proper size and type may be fed from the magazine 1 onto the conveyor belt 4. It also activates the stationary stopping means 19 associated with that machine and initiates operation of the turntable. The turntable may rotate either clockwise or counterclockwise to the open machine and when the damping unit 18 contacts the stationary stop means 19, the turntable stops and the transfer unit 9 is initiated to grip the tire 3 in the open recapping machine and withdraw the tire from the machine. When this is completed, the turntable may be rotated in the opposite direction by the control panel 40 to the outgoing conveyor 7 where a stationary stopping means is activated to arrest the turntable and initiate discharge of the tire onto the conveyor 7. Upon discharge of the tire onto the conveyor 7, the machine automatically advances the turntable to the loading station which has a tire of the proper size now positioned on the roller table 8. The transfer unit 9 is stopped by the stationary stop means 19 in registry with the loading station and the fresh tire is gripped by the transfer unit 9 and carried to the open recapping machine where it is stopped by the previously-activated stop means 19 at that station. The apparatus also signals the recapping machine that the loading operation is completed so that the machine may close itself and perform the recapping operation on the fresh tire. The transfer mechanism will then proceed to the next machine which will have completed its first operation and will have signaled the magazine to send to the roller conveyor 8 a tire of the desired size and type for loading into the next machine.

The invention therefore permits automatic operation of the recapping plant without the need for attendance by operators in the vicinity of the recapping machine. The tires on the discharge conveyor 7 may be passed onto inspection testing and the like. If faults are detected in one of the machines or with the program, then an alarm system may be activated to switch the transfer mechanism to an emergency program designed to correct the fault. All of the movements of the transfer mechanism are acknowledged so that the various steps in the operation may be performed automatically one after the other. If a particular recapping machine breaks down or requires maintenance or repair, it may be omitted from the program in the control panel 40 without disturbing the operation of the balance of the recapping machine.

The embodiment of the invention illustrated in FIGS. 1–17 is well adapted for use in plants for recapping relatively light automobile tires where there is adequate space for storing tire casings which are ready for recapping. For plants with recap heavier tires, such as tires for trucks, tractors, and the like, it is desirable to provide an alternate arrangement for transferring tires within the cluster of recapping machines. For example, FIGS. 18 and 19 illustrate an alternative arrangement for such use. In these figures, the transfer mechanism 59 is illustrated in which a turntable 63 is mounted on a base 60 for rotation within a cluster of recapping stations similar to the cluster 5 of the previously-described embodiment. The turntable 63 is rotated about its center by a turning motor 64.

The gripping mechanism of this embodiment includes a support frame 65 which is mounted for slidable movement on the turntable 63 in a substantially radial direction so that the frame 65 may be displaced between a position substantially overlying the center of the turntable 63 and a radially offset position adjacent the periphery of the turntable 63. Displacement of the frame 65 is effected by a slider motor 62 which is suitably coupled to the frame 65. Mounted on the frame 65, the gripping mechanism comprises a boom 66 pivoted to the frame 65 at its base for pivotal movement in a plane radial to the turntable and having at its upper end a cantilevered support beam 67 disposed substantially parallel to the turntable 63 and having gripping arms 69 mounted at its outer extremity for engaging around the outer periphery of the tires. The pivotal movement of the boom 66 is coordinated to maintain the cantilevered beam 67 substantially horizontal as the gripping arms 68 are elevated and lowered by the movement of the boom 66. Elevation and lowering of the cantilevered beam 67 also effects radial displacement of the gripping arms 68 which may be countered by slidable displacement of the framework 65 on the turntable.

The foregoing structure is designed particularly for use with heavy tires. To this end, the structure permits the gripping arms, after engagement of the tires thereby, to be displaced radially inward along with the frame 65 so that the center of the frame 65 overlies the center of the turntable, thereby equalizing the vertical load upon the turntable. The arrangement of the boom and cantilever also provides a counter-balanced effect for the tire when the gripping mechanism is retracted to its central position so as to minimize the rotational forces resulting from the eccentric loading which inherently results from the gripping arrangement shown in the previously-described embodiment. In this fashion, the alternate form of transfer mechanism shown at 59 provides an improved structure for handling materials having substantial weight and bulk. It will be clear that other embodiments of transfer mechanism may be employed to accommodate different materials when the apparatus is designed for use with materials other than tires.

The magazine arrangement for storing tires shown in FIG. 1 is particularly applicable for plants having ample floor space in which to store tires for recapping. The roller ways 2 are designed to accommodate the tires in flat position as shown, and it is apparent that this storage arrangement is space-consuming. Where space is limited, for example in older plants, it is desirable to store the tires on edge in an elevated position so that the floor space in the plant may be used productively while permitting ample storage of tires. A suitable storage magazine arrangement is illustrated in FIGS. 20 through 23. Tires ready for recapping are suspended from an elevated track for feeding to the feed conveyor. In these figures, a feed conveyor 74 is illustrated which corresponds substantially to the feed conveyor 4 of the arrangement shown in FIGS. 1 and 2. As in the previous embodiment, a separate feed line is provided for each size and type of tire and these multiple feed lines are designed to discharge onto the conveyor 74. In the present instance, the conveyor 74 has a support rail 75 along one side and a complementary support rail 76 on the other side. At the magazine side of the conveyor, a feed apron 77 is mounted on the support rail 76 and a suitable guide roller 78 projects upwardly from the guide rail 26 between the apron 77 and the conveyor 74 at the "downstream" side of each magazine. The guide roller 78 is freely rotatable about a vertical axis for a purpose to be described hereinafter.

The tires are fed to the conveyor 74 from a magazine which includes a feed track 81 in the form of a hollow box beam as shown in FIG. 23. Trolleys 82 are rotatable in the box beam 81 and have a hook 83 suspended therefrom. The L-shaped hook 83 is adapted to support a tire on edge as shown in FIG. 20. The track 81 declines downwardly toward the conveyor 74 in a gradual fashion to a discharge station. At the discharge station, two gate means are provided at 85 and 86 which are coordinated to permit escape of a single tire-laden trolley at a time through the discharge station. The gates 85 and 86 are controlled by a suitable signal from automatic or manual control means 87. The arrangement is such that the gate 85 permits a single trolley to enter the space between the gates 85 and 86, and this single trolley is retained in position until the control means signals a release, the gate 85 closing to prevent additional entry of trolleys into this space. Upon receipt of a signal from the control means, the gate 86 releases the trolley from the space and allows the trolley to follow the steep inclined portion 88 into the discharge loop 89 overlying the apron 77. As the tire drops down the inclined portion 88, the lower edge of the tire engages the apron 77 so that the tire may disengage from the hook 83 and fall onto the conveyor 74. Gate 86 is then closed and the gate 85 is opened to position a next tire for discharge.

As the lower end of the dropped tire engages the apron 77, it disengages from the hook 83 and falls onto the conveyor 74 spanning across the beam 76 onto the apron 77. As the conveyor 74 advances in the direction shown by the arrow in FIG. 21, the advance of the conveyor carries the tire forwardly downstream into engagement with the roller 78 which will serve to displace the entire tire laterally onto the center of the conveyor belt 74. The forward displacement of the conveyor 74 and the freedom for rotation of the roller 78 assists the tire to rotate about its center so as to "walk" onto the center of the conveyor belt. The conveyor 74 thereupon carries the tire to the feeding roller table of the cluster of recapping machines. The empty hook may then be returned by the return run 91 of the track to the supply area where it may be loaded and transferred to the feed end of the track 81.

While particular embodiments of the invention have been hereinbefore illustrated and described, it is not intended to limit the invention to these particular embodiments, but further modifications and substitutions may be made therein and thereto within the scope of the following claims.

I claim:

1. Material-handling apparatus for a plant processing different sizes or types of products comprising:
   (a) a magazine for storing the products to be treated, each size or type of product having a separate supply, a single feed conveyor operable to receive the products from all of said supplies, and to advance a product from said supplies to the terminal end of the feed conveyor, and having stop means to stop the conveyor when a product is positioned at its terminal end;
   (b) a plurality of product-treating machines aligned side-by-side with the terminal end of said conveyor;
   (c) an outgoing conveyor for removing the treated products from said plurality of machines and having a feed end aligned within said machines;
   (d) transfer mechanism for transferring the product selectively from the terminal end of the feed conveyor to a product-treating machine and from a product-treating machine to the feed end of the outgoing conveyor;
   (e) a fixing unit associated with the terminal end of the feed conveyor to engage the product thereon and position it in a predetermined position;
   (f) indexing means including stop means on the transfer mechanism and a plurality of individual stop means, at least one for each treating machine, operable selectively to index the transfer mechanism to a selected treating machine; and
   (g) control means interconnecting said magazine, said treating machines, said transfer mechanism and said indexing means to discharge a product of a given size or type onto the feed conveyor when any selected treating machine for that size or type of product is in condition to receive the product, and conditioning said apparatus to cause said transfer mechanism to transfer the product from the feed conveyor to said selected treating machine.

2. Material-handling apparatus according to claim 1 wherein said magazine comprises a plurality of parallel roller ways.

3. Apparatus according to claim 2 wherein said roller ways are disposed side-by-side at right angles to the feed conveyor to discharge products from the end of the roller way directly onto said feed conveyor.

4. Apparatus according to claim 1 wherein the discharge end of said feed conveyor comprises a horizontal roller table which is elevated at approximately the height of the product openings of the treating machines, said feed conveyor being disposed at a low level and having an inclination upwards to said roller table.

5. Apparatus according to claim 4 wherein said roller table comprises at least one driven roller extending across the full width of the feed conveyor and two side formations of rollers extending beyond said driven roller leaving an open space therebetween so as to support the product at its opposite sides over said open space.

6. Apparatus according to claim 5 wherein said product has an opening therein between its opposite sides and wherein said fixing unit is mounted below said roller table to project upwardly between said side formations to engage within said opening of the product.

7. Apparatus according to claim 6 wherein said product has a circular opening centered therein, characterized in that the fixing unit includes rollers adapted to project into said central opening, crank arms mounting said rollers for displacement substantially radially inward and outward, and cylinder means for selectively displacing said crank arms outward and inward to center the product concentrically with said rollers.

8. Apparatus according to claim 7 wherein said fixing rollers are three in number and are disposed at equal angular distances about the center of the fixing machine.

9. Apparatus according to claim 6 wherein said fixing unit is vertically displaceable between a position below said roller table out of the path of movement of products thereon, and an upper position within the central opening of said product, and connections to said feed-conveyor stop means operable to elevate said fixing unit upon engagement of the products with said stop means.

10. Apparatus according to claim 1 wherein said treating machines are aligned in a circle and are spaced apart at an angular distance of 30°.

11. Apparatus according to claim 10 wherein the discharge end of the feed conveyor and the feed end of the outgoing conveyor are diametrically opposite each other in said circle.

12. Apparatus according to claim 10 wherein said transfer mechanism comprises a central frame having a circular supporting rail concentric with said circular alignment of treating machines, a turntable mounted for rotation on said rail, means to rotate said turntable, and gripping mechanism on said turntable having gripping arms operable to engage the products on said conveyors and in the product openings of said treating machines.

13. Apparatus according to claim 12 wherein said gripping mechanism includes means to raise and lower said gripping arms and to displace said gripping arms radially inwardly and outwardly relative to the center of said turntable.

14. Apparatus according to claim 12 wherein said gripping mechanism includes guide bars, and said gripping arms include sliders mounted on said guide bars for movement in opposite directions toward and from each other, respectively.

15. Apparatus according to claim 14 wherein said sliders have racks mounted thereon, said racks confronting each other in spaced parallel relation and having a rotatable pinion gear centered therebetween and meshed therewith to insure equal and opposite movements of said arms.

16. Apparatus according to claim 12 wherein said gripping arms comprise a plurality of individual hollow segments having means for causing heat exchange fluid to flow therethrough.

17. Apparatus according to claim 12 wherein said indexing means comprises at least one hydraulic or pneumatic damper means.

18. Apparatus according to claim 17 wherein said hydraulic damper means comprises a pair of oppositely-directed dash pots disposed circumferentially on the turntable of said transfer mechanism, said dash pots being disposed at different distances from the center of the turntable so as to travel in different circular paths about the center of said turntable.

19. Apparatus according to claim 18 wherein each dash pot has a sensor associated therewith and connected to the drive means for said turntable to arrest the turntable upon actuation of the sensor.

20. Apparatus according to claim 18 wherein the individual stop means at each machine comprises a cylinder disposed radially to the turntable of the transfer mechanism having a piston displaceable in the radial direction between an activated and an inactive position, said piston carrying a pair of wings disposed radial to said piston and at right angles to one another, and stop means engageable alternatively with said wings to dispose one or the other of said wings in operative or upright position intercepting the path of movement of one of said dash pots when said piston is in its activated position, the other of said wings being in an inoperative or down position.

21. Apparatus according to claim 20 wherein said dash pot is operable to be engaged and operated by one side of the upright wing when said turntable is rotating in a clockwise direction and including means to engage the other side of the wing and pivot said wing to its down position when the turntable is rotating in the opposite direction, said pivotal movement erecting the other wing to its upright position.

22. Apparatus according to claim 21 including a turn wedge cooperable with said wings to pivot said one wing from said down position to said upright position upon actuation of said cylinder to displace said wings radially.

23. Apparatus according to claim 20 including limit switch means for controlling the radial displacement of said piston of the stop cylinder.

24. Material-handling apparatus for a plant recapping automotive tires of different sizes or types comprising:
  (a) a magazine for storing the tires to be treated, each size or type of tire having a separate supply, a single feed conveyor operable to receive the tires from all of said supplies, and to advance a tire from said supplies to the terminal end of the feed conveyor, and having stop means to stop the conveyor when a tire is positioned at its terminal end;
  (b) a plurality of tire recapping machines having means to recap tires aligned side-by-side in a circle including the terminal end of said conveyor;
  (c) an outgoing conveyor for removing the recapped tires from said circle and having a feed end within said circle;
  (d) transfer mechanism within said circle for transferring the tires selectively from the terminal end of the feed conveyor to a recapping machine and from a recapping machine to the feed end of the outgoing conveyor;
  (e) a fixing unit associated with the terminal end of the feed conveyor to engage the tire thereon and center it in a predetermined position;
  (f) indexing means including stop means on the transfer mechanism and a plurality of individual stop means, at least one for each recapping machine operable selectively to index the transfer mechanism to a selected recapping machine; and
  (g) control means interconnecting said magazine, said recapping machines, said transfer mechanism and said indexing means to discharge a tire of a given size or type onto the feed conveyor when any selected recapping machine for that size or type of product is in condition to receive the tire, and conditioning said apparatus to cause said transfer mechanism to transfer the tire from the feed conveyor to said selected recapping machine.

* * * * *